United States Patent [19]

Jenkins, III et al.

[11] Patent Number: 4,543,399
[45] Date of Patent: Sep. 24, 1985

[54] FLUIDIZED BED REACTION SYSTEMS

[75] Inventors: John M. Jenkins, III; Russell L. Jones, both of South Charleston; Thomas M. Jones, Dunbar, all of W. Va.

[73] Assignee: Union Carbide Corporation, Danbury, Conn.

[21] Appl. No.: 594,962

[22] Filed: Apr. 3, 1984

Related U.S. Application Data

[63] Continuation of Ser. No. 361,547, Mar. 24, 1982, abandoned.

[51] Int. Cl.$^4$ ................................................ C08F 2/34
[52] U.S. Cl. .......................................... 526/70; 526/68
[58] Field of Search ...................... 526/67, 68, 70, 87, 526/88

[56] References Cited

U.S. PATENT DOCUMENTS

| | | |
|---|---|---|
| 2,502,953 | 4/1950 | Jahnig . |
| 2,936,303 | 5/1960 | Coins . |
| 3,023,203 | 2/1962 | Dye . |
| 3,254,070 | 5/1966 | Roeieu . |
| 3,256,263 | 6/1966 | Wisseroth et al. . |
| 3,298,792 | 1/1967 | DiDrusco . |
| 3,300,457 | 1/1967 | Schmid et al. . |
| 3,469,948 | 9/1969 | Anderson et al. . |
| 3,594,358 | 7/1971 | Moberly . |
| 3,595,840 | 7/1971 | Moberly . |
| 3,615,253 | 10/1971 | Warzel . |
| 3,622,553 | 11/1971 | Cines . |
| 3,625,932 | 11/1971 | Green . |
| 3,637,616 | 1/1972 | Peterson . |
| 3,639,377 | 2/1972 | Trieschmann et al. . |
| 3,652,527 | 3/1972 | Trieschmann et al. . |
| 3,709,853 | 1/1973 | Karapinka . |
| 3,770,714 | 11/1973 | Derscher et al. . |
| 3,779,712 | 12/1973 | Calvert et al. . |
| 3,922,322 | 11/1975 | Dormenval et al. . |
| 3,944,534 | 3/1976 | Sennari et al. . |
| 3,965,083 | 6/1976 | Jezl et al. . |
| 3,970,611 | 7/1976 | Jezl et al. . |
| 3,971,768 | 7/1976 | Peters et al. . |
| 4,012,573 | 5/1977 | Trieschmann ........................ 526/67 |
| 4,061,849 | 12/1977 | Muenster ............................. 526/68 |
| 4,064,111 | 12/1977 | Masuda et al. . |
| 4,065,609 | 12/1977 | Willmore . |
| 4,124,656 | 11/1978 | Walkenhorst . |
| 4,222,986 | 9/1980 | Smith et al. . |
| 4,267,146 | 5/1981 | Kurtz et al. . |
| 4,282,177 | 8/1981 | Kurtz et al. . |
| 4,408,024 | 10/1983 | Matsuyama .......................... 526/67 |
| 4,442,271 | 4/1984 | Rau ....................................... 526/68 |

FOREIGN PATENT DOCUMENTS

| | | |
|---|---|---|
| 663654 | 5/1963 | Canada . |
| 0021605 | 1/1981 | European Pat. Off. . |
| 0003228 | 10/1981 | European Pat. Off. . |
| 2139182 | 2/1972 | Fed. Rep. of Germany . |
| 55-045744 | 3/1980 | Japan . |
| 4608 | 1/1981 | Japan . |
| 1110566 | 4/1968 | United Kingdom . |

Primary Examiner—Paul R. Michl
Attorney, Agent, or Firm—Clement J. Vicari

[57] ABSTRACT

A process is described for increasing the space time yield of polymer production in a fluidized bed reactor employing an exothermic polymerization reaction by cooling the recycle stream to below its dew point and returning the resultant two-phase fluid stream to the reactor to maintain the fluidized bed at a desired temperature above the dew point of the recycle stream.

39 Claims, 1 Drawing Figure

FLUIDIZED BED REACTION SYSTEMS

Figure 1:
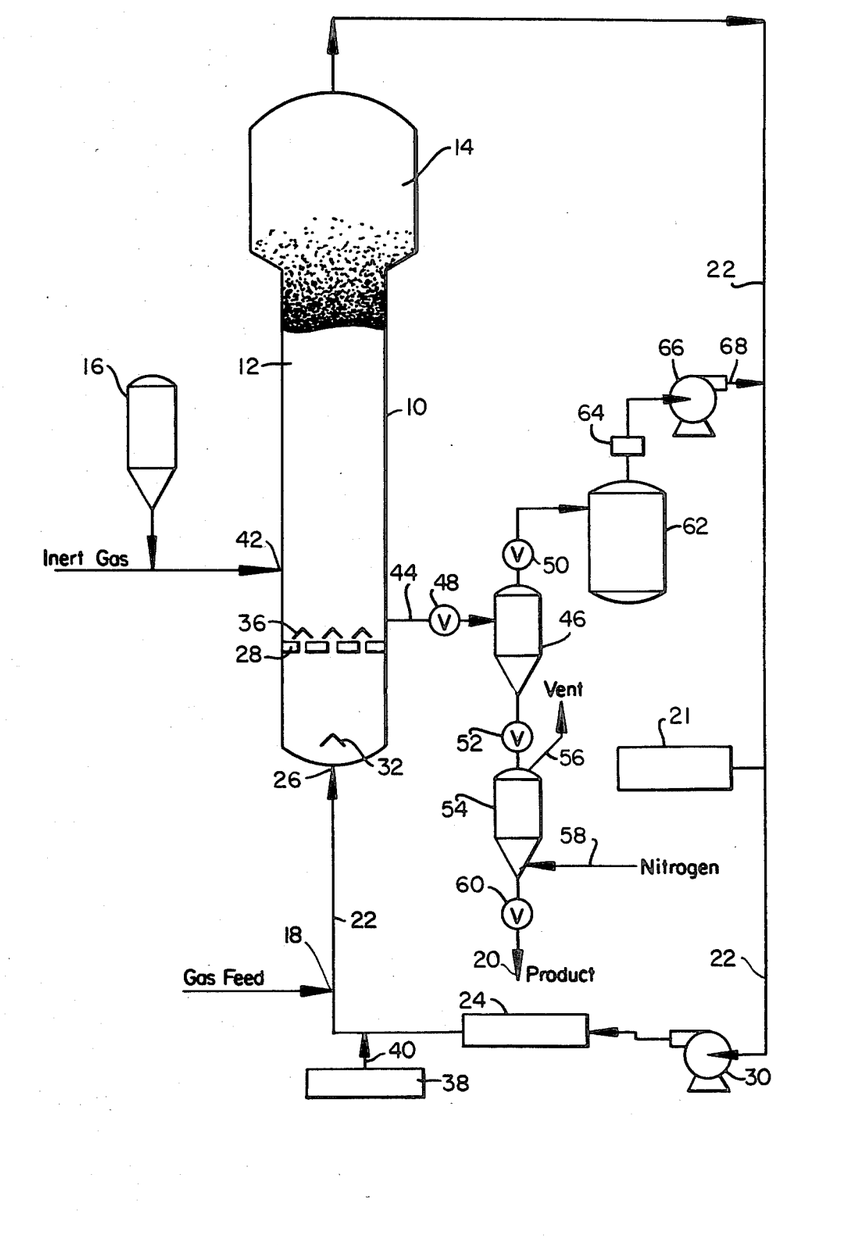

This application is a continuation of prior U.S. application Ser. No. 361,547, Mar. 24, 1982, abandoned.

SUMMARY OF THE INVENTION

This invention relates to a novel method for improving the space time yield of an exothermic polymerization reaction conducted in a fluidized bed reactor, by increasing the removal of the heat of polymerization from the reactor by cooling gases, continuously removed from the reactor, to a temperature below the dew point temperature of such gases and returning the resultant two phase fluid mixture into the reactor to maintain the temperature of the fluidized bed at the desired level.

BACKGROUND OF THE INVENTION

The discovery of the fluidized bed process for the production of polymers provided a means for producing these diverse and widely used polymers with a drastic reduction in capital investment and a dramatic reduction in energy requirements as compared to then conventional processes. The present invention provides a means for even greater savings in energy and capital cost by affording a simple and efficient means for obtaining a substantial increase in production rate in a given size reactor over what was previously possible in a fluidized bed process.

The most common and perhaps universal means of heat removal employed in conventional fluidized bed reactor processes is by compression and cooling of the recycle gas stream at a point external to the reactor. In commercial scale fluidized bed reaction systems for producing polymers such as polyethylene, the amount of fluid which must be circulated to remove the heat of polymerization is greater than the amount of fluid required for support of the fluidized bed and for adequate solids mixing in the fluidized bed. The fluid velocity in the reactor is limited to prevent excessive entrainment of solids. A constant bed temperature will result if the heat generated by the polymerization reaction (which is proportional to the polymer production rate) is equal to the heat absorbed by the fluidizing stream as it passes through the bed, plus any heat removed or lost by other means.

Unfortunately, it has long been believed that the recycle gas temperature could not be lowered any further than to a point slightly above the dew point of the recycle gas stream. The dew point is that temperature at which liquid condensate begins to form in the gas stream. Common practice has been to limit the temperature of the recycle stream at the outlet of the cycle heat exchange zone to a temperature at least about 3° to 10° C. above its dew point (see copending U.S. patent application Ser. No. 49,555 of June 18, 1979, now abandoned, equivalent to published European Patent Specification No. 0 021 605, page 22, lines 8-22). This assumption was predicated on the belief that the introduction of liquid into a gas phase fluidized bed reactor would inevitably result in plugging of the distribution plate, if one is employed; non-uniformity of monomer concentrations inside the fluidized bed and accumulation of liquid at the bottom of the reactor which would interfere with continuous operation or result in complete reactor shut-down. For products, such as those using hexene as a comonomer, the relatively high dew point of the recycle stream has until now severely restricted the production rate.

The primary limitation on reaction rate in a fluidized bed reactor is the rate at which heat can be removed from the polymerization zone. Although they differ in very important ways from gas fluidized bed reaction systems, the same heat limitation problems exist in other types of reaction systems such as stirred reaction systems and to some extent, slurry reaction systems.

In U.S. Pat. No. 3,256,263, heat removal in a stirred reaction system is achieved by the compression of recycle gases and expansion upon reentry into the reactor. In other stirred or paddle-type reaction systems some additional cooling is effected by the injection of liquid onto the top of the bed. See for example U.S. Pat. Nos. 3,254,070; 3,300,457 and 3,652,527.

In U.S. Pat. Nos. 3,965,083; 3,970,611 and 3,971,768 assigned to Standard Oil Co., cooling of a stirred bed reactor is supplemented by injection of liquids on the top of the bed.

In U.S Pat. No. 4,012,573 (Trieschmann et al.) gases withdrawn from a stirred reactor are condensed to liquid and returned in liquid form to the stirred reactor where the liquid is brought into desired contact with polymer in the stirred bed.

Mitsubishi Petrochemical Co. has proposed the use of liquids or regasified liquids for cooling in a gas phase reactor (J No. 55/045,744/80 and DT No. 2 139 182). In both of these descriptions the liquid or regasified liquid is injected into the bed rather than entering with the fluidizing gas as in the present invention. DT No. 2 139 182 is specific to stirred beds rather than fluidized beds. In J No. 55/045,744/80 the liquid is regasified before being injected into the fluidized bed.

In a fluidized bed reaction system, as distinguished from stirred or paddle-type reaction systems, uniform distribution of monomer and catalysts in the upwardly moving gas stream is essential to avoid hot spots and resulting polymer chunks. In stirred and paddle-type reactors these problems are overcome by mechanical stirring and agitation. A further requirement of a fluidized bed reactor system is that the velocity of gas flowing through the reactor be adequate to maintain the bed in a fluidized state. The gas velocity required to keep the bed in a fluidized suspension cannot be achieved under normal conditions by mere injection of liquid at the bottom of the bed. Therefore, the direct liquid injection cooling of a reactor, as described by Treschman et al. is not a viable option for a fluidized bed reaction system.

DETAILED DESCRIPTION OF THE INVENTION

While not limited to any particular type or kind of polymerization reaction (so long as the reaction is of an exothermic nature), this invention is particularly suited to polymerization reactions involving the polymerization of one or more of the monomers listed below:

I. Olefin type: ethylene, propylene, butene-1, pentene-1, 4-methylpentene-1, hexene-1, styrene.

II. Polar vinyl monomer type: vinyl chloride, vinyl acetate, vinyl acrylate, methyl methacrylate, tetrafluoroethylene, vinyl ether, acrylonitrile.

III. Diene type (conjugated and non-conjugated): butadiene, 1,4-hexadiene, isoprene, ethylidene norbornene.

IV. Acetylene type: acetylene, substituted acetylene, such as methyl acetylene.

V. Aldehyde type: formaldehyde.

It is to be noted that catalysts employable in the fluidized bed polymerization of the above monomer types would, respectively, most usually be as follows:

I. Coordinated anionic catalyst
II. Cationic catalyst for copolymers with ethylene only; others of this type require a free-radical catalyst
III. Either a free-radical catalyst or a coordinated anionic catalyst
IV. A coordinated anionic catalyst
V. An anionic catalyst Although this invention is not limited to any specific type of polymerization reaction, the following discussions of the operation of the process are directed to polymerizations of olefin-type monomers where the invention has been found to be especially advantageous.

In very general terms, a conventional fluidized bed process for producing resins, particularly polymers produced from monomers, is practiced by passing a gaseous stream containing one or more monomers continuously through a fluidized bed reactor under reactive conditions and in the presence of catalyst. The gaseous stream containing unreacted gaseous monomer is withdrawn from the reactor continuously, compressed, cooled and recycled into the reactor. Product is withdrawn from the reactor. Make-up monomer is added to the recycle stream.

The polymer-forming reaction is exothermic, making it necessary to maintain in some fashion the temperature of the gas stream inside the reactor at a temperature not only below the resin and catalyst degradation temperatures, but at a temperature below the fusion or sticking temperature of resin particles produced during the polymerization reaction. This is necessary to prevent plugging of the reactor due to rapid growth of polymer chunks which cannot be removed in a continuous fashion as product. It will be understood, therefore, that the amount of polymer that can be produced in a fluidized bed reactor of a given size in a specified time period is directly related to the amount of heat which can be withdrawn from the fluidized bed.

In accordance with this invention the recycle gas stream is intentionally cooled to a temperature below the dew point of the recycle gas stream to produce a two-phase gas-liquid mixture under conditions such that the liquid phase of said mixture will remain entrained in the gas phase of said mixture at least from the point of entry into the fluidized bed reactor until volatilized or until passage into the fluidized bed. A substantial increase in space time yield results from the practice of this invention with little or no change in product properties or quality. When practiced as described herein the overall process proceeds continuously and smoothly and without unusual operational difficulties.

It may be desirable in some instances to raise the dew point of the recycle gas stream to further increase heat removal. The recycle stream dew point can be increased by: (1) raising the operating pressure of the reaction system; (2) increasing the concentration of condensible fluids in the recycle stream; and/or (3) reducing the concentration of non-condensible gases in the recycle stream. In one embodiment of this invention, the dew point of the recycle stream may be increased by the addition of a condensible fluid to the recycle stream which is inert to the catalyst, reactants, and the products of the polymerization reaction. The fluid can be introduced into the recycle stream with the make-up fluid or by any other means or at any other point in the system. Examples of such fluids are saturated hydrocarbons, such as butanes, pentanes or hexanes.

A primary limitation on the extent to which the recycle gas stream can be cooled below the dew point is in the requirement that gas-to-liquid ratio be maintained at a level sufficient to keep the liquid phase of the two-phase fluid mixture in an entrained or suspended condition until the liquid is vaporized. It is also necessary that the velocity of the upwardly flowing fluid stream be sufficient to maintain the fluidized bed in a suspended condition.

While the liquid content of the two-phase recycle stream can be quite high, as a general rule, the quantity of condensed liquid contained in the gas phase should not exceed about 20 weight percent and preferably should not exceed about 10 weight percent, provided always that the velocity of the two-phase recycle stream is high enough to keep the liquid phase in suspension in the gas and to support the fluidized bed within the reactor.

The entry point for the two-phase recycle stream should be below the fluidized bed (polymerization zone) to ensure uniformity of the upwardly flowing gas stream and to maintain the bed in a suspended condition. The recycle stream containing entrained liquid is introduced into the reactor at a point in the lower region of the reactor and most preferably at the very bottom of the reactor to ensure uniformity of the fluid stream passing upwardly through the fluidized bed.

A baffle or similar means for preventing regions of low gas velocity in the vicinity of the recycle stream entry point may be provided to keep solids and liquids entrained in the upwardly flowing recycle stream.

Although there is no apparent advantage in doing so, the two-phase recycle stream can be divided into two or more separate streams one or more of which can be introduced directly into the polymerization zone provided that sufficient gas velocity below and through the bed is provided to keep the bed suspended. In all cases the composition of the gas stream is kept essentially uniform and flowing in a manner such that there are no dead spaces in the bed where unremovable solids can form.

It will be apparent that if desired, it is possible to form a two-phase fluid stream within the reactor at the point of injection by separately injecting gas and liquid under conditions which will produce a two-phase stream. Little advantage is seen in operating in this fashion due to the added and unnecessary burden and cost of separating the gas and liquid phases after cooling. It may however, be desirable to inject make-up monomer into the reactor in this fashion. The injection of liquid or gaseous make-up monomer at the point of entry of the two-phase recycle stream or elsewhere in the reactor or in the recycle stream is contemplated by this invention.

The advantages of this invention are not limited to the production of polyolefin resins. This invention can be practiced in connection with any exothermic polymerization process carried out in a gas phase fluidized bed. The advantages of this invention over conventional processes will generally increase in direct relation to the nearness of the dew point temperature of the recycle stream to the reaction temperature within the interior of the fluid bed. For obvious reasons this invention cannot be used in a reaction system in which the reaction temperature within its fluidized bed is below the dew point of the recycle gas stream.

The applicability of this invention to the production of any given polymer can be determined by the use of the following formula:

$$X = \frac{P \cdot H_{rxn}}{G_{mass} \cdot CP_{gas}(T_{rxn} - T_{limit})}$$

P=desired polymer production rate; constrained to rates giving X less than 1.0 without subject invention.

$H_{rxn}$=heat of polymerization of specific polymer being produced.

$G_{mass}$=mass flow rate of recycle stream; limited to a minimum value by the need for adequate fluidization and mixing in the bed and to a maximum value by entrainment of solids. Specific minima and maxima depend on numerous factors known to those skilled in the art.

$CP_{gas}$=heat capacity of the recycle stream.

$T_{rxn}$=temperature of the reaction zone (fluid bed); has maximum value depending on the sticking temperature of the polymer at the pressure of the recycle stream and/or the catalyst performance, and a minimum value which is dependent on catalyst performance.

$T_{limit}$=minimum temperature of the recycle stream entering the reaction zone as limited prior to the present invention. This temperature is either the dew point of the recycle stream or the cooling limit of the heat exchange zone, whichever is higher. If $T_{limit}$ is the recycle stream dew point, the invention is practiced by simply cooling the stream to a temperature below its dew point. If $T_{limit}$ is controlled by the heat exchange zone, the invention is practiced by adding a condensable fluid to increase the dew point of the recycle stream to a temperature above the cooling limit of the heat exchange zone.

Whenever the value of X is greater than 1, the use of this invention will afford a benefit and as the value of X increases, the greater are the benefits which can result from this invention.

A fluidized bed reaction system which is particularly suited to production of polyolefin resin by the practice of the process of the present invention is illustrated in the drawing. With reference thereto, the reactor 10 consists of a reaction zone 12 and a velocity reduction zone 14.

In general, the height to diameter ratio of the reaction zone can vary in the range of about 2.7:1 to about 4.6:1. The range, of course, can vary to larger or smaller ratios and depends upon the desired production capacity. The cross-sectional area of the velocity reduction zone 14 is typically within the range of about 2.6 to about 2.8 multiplied by the cross-sectional area of the reaction zone 12.

The reaction zone 12 includes a bed of growing polymer particles, formed polymer particles and a minor amount of catalyst particles fluidized by the continuous flow of polymerizable and modifying gaseous components in the form of make-up feed and recycle fluid through the reaction zone. To maintain a viable fluidized bed, the superficial gas velocity through the bed must exceed the minimum flow required for fluidization, and preferably is at least 0.2 ft/sec above minimum flow. Ordinarily, the superficial gas velocity does not exceed 5.0 ft/sec and usually no more than 2.5 ft/sec is sufficient.

It is essential that the bed always contain particles to prevent the formation of localized "hot spots" and to entrap and distribute the particulate catalyst throughout the reaction zone. On start up, the reactor is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of desired polymer particles supplants the start-up bed.

The partially or totally activated precursor composition and/or catalyst used in the fluidized bed is preferably stored for service in a reservoir 16 under a blanket of a gas which is inert to the stored material, such as nitrogen or argon.

Fluidization is achieved by a high rate of fluid recycle to and through the bed, typically in the order of about 50 times the rate of feed of make-up fluid. The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor.

Make-up fluid is fed to the bed at point 18. The composition of the make-up stream is determined by a gas analyzer 21. The gas analyzer determines the composition of the recycle stream and the composition of the make-up stream is adjusted accordingly to maintain an essentially steady state gaseous composition within the reaction zone.

The gas analyzer is a conventional gas analyzer which operates in conventional manner to indicate recycle stream composition and which is adapted to regulate the feed and is commercially available from a wide variety of sources. Generally, the gas analyzer 21 can be positioned so as to receive gas from a point between the velocity reduction zone 14 and heat exchanger 24.

To ensure complete fluidization, the recycle stream and, where desired, part of the make-up stream are returned through recycle line 22 to the reactor at point 26 below the bed. There may be preferably a gas distributor plate 28 above the point of return to aid in fluidizing the bed. In passing through the bed, the recycle stream absorbs the heat of reaction generated by the polymerization reaction.

The portion of the fluidizing stream which does not react in the bed constitutes the recycle stream which is removed from the polymerization zone, preferably by passing it into velocity reduction zone 14 above the bed where entrained particles are given an opportunity to drop back into the bed.

The recycle stream is then compressed in a compressor 30 and then passed through a heat exchange zone wherein the heat of reaction is removed before it is returned to the bed. The heat exchange zone is typically a heat exchanger 24 which can be of the horizontal or vertical type. The recycle stream is then returned to the reactor at its base 26 and to the fluidized bed through gas distributor plate 28. A gas deflector 32 is preferably installed at the inlet to the reactor to prevent contained polymer particles from settling out and agglomerating into a solid mass.

The temperature of the bed is controlled at an essentially constant temperature under steady state conditions by constantly removing the heat of reaction. No noticeable temperature gradient appears to exist within the upper portion of the bed. A temperature gradient will exist in the bottom of the bed in a layer of about 6 to 12 inches, between the temperature of the inlet fluid and the temperature of the remainder of the bed.

Good gas distribution plays an important role in the operation of the reactor. The fluidized bed contains growing and formed particulate polymer particles, as well as catalyst particles. As the polymer particles are hot and possibly active, they must be prevented from settling, for if a quiescent mass is allowed to exist, any active catalyst contained therein may continue to react and cause fusion. Diffusing recycle fluid through the bed at a rate sufficient to maintain fluidization throught the bed is, therefore, important.

Gas distribution plate 28 is a preferred means for achieving good gas distribution and may be a screen, slotted plate, perforated plate, a plate of the bubble-cap type and the like. The elements of the plate may all be stationary, or the plate may be of the mobile type disclosed in U.S. Pat. No. 3,298,792. Whatever its design, it must diffuse the recycle fluid through the particles at the base of the bed to keep the bed in a fluidized condition, and also serve to support a quiescent bed of resin particles when the reactor is not in operation.

The preferred type gas distributor plate 28 is generally of the type which is fabricated from metal and which has holes distributed across its surface. The holes are normally of a diameter of about ½ inch. The holes extend through the plate, and over each hole there is positioned a triangular angle iron identified as reference numeral 36 which is fixedly mounted to plate 28. The angle irons serve to distribute the flow of fluid along the surface of the plate so as to avoid stagnant zones of solids. In addition they prevent the resin from flowing through the holes when the bed is settled.

Any fluid inert to the catalyst and reactants can also be present in the recycle stream. An activator compound, if utilized, is preferably added to the reaction system downstream from heat exchanger 24. Thus, the activator may be fed into the recycle system from dispenser 38 through line 40.

It is essential to operate the fluid-bed reactor at a temperature below the sintering temperature of the polymer particles to ensure that sintering will not occur. The sintering temperature is a function of resin density. In general, polyethylene low-density resins, for example, have a low sintering temperature and polyethylene high-density resins, for example, have a higher sintering temperature. For example, temperatures of from about 75° C. to about 95° C. are used to prepare ethylene copolymers having a density of from about 0.91 g/cm$^3$ to about 0.95 g/cm$^3$, while temperatures of from about 100° C. to about 115° C. are used to prepare ethylene copolymers or homopolymers having a density of from about 0.95 g/cm$^3$ to about 0.97 g/cm$^3$.

The fluid-bed reactor may be operated at pressures of up to about 1000 psi, and is for polyolefin resin production preferably operated at a pressure of from about 100 psi to about 350 psi, with operation at the higher pressures in such ranges favoring heat transfer since an increase in pressure increases the unit volume heat capacity of the gas.

The partially or totally activated precursor composition and/or catalyst (hereinafter collectively referred to as catalyst) is injected into the bed at a rate equal to its consumption at a point 42 which is above distributor plate 28. Preferably, the catalyst is injected at a point in the bed where good mixing of polymer particles occurs. Injecting the catalyst at a point above the distribution plate is an important feature for satisfactory operation of a fluidized bed polymerization reactor. Since catalysts are highly active, injection of the catalyst into the area below the distributor plate may cause polymerization to begin there and eventually cause plugging of the distributor plate. Injection into the fluidized bed, instead, aids in distributing the catalyst throughout the bed and tends to preclude the formation of localized spots of high catalyst concentration which may result in the formation of "hot spots." Injection of the catalyst into the reactor above the bed may result in excessive catalyst carryover into the recycle line where polymerization may begin and plugging of the line and heat exchanger may eventually occur.

The catalyst can be injected into the reactor by various techniques. It is preferred, however, to continuously feed the catalyst into the reactor utilizing a catalyst feeder as disclosed; e.g., in U.S. Pat. No. 3,779,712. The catalyst is preferably fed into the reactor at a point 20 to 40 percent of the reactor diameter away from the reactor wall and at a height of about 5 to about 30 percent of the height of the bed.

A gas which is inert to the catalyst, such as nitrogen or argon, is preferably used to carry the catalyst into the bed.

The rate of polymer production in the bed depends on the rate of catalyst injection and the concentration of monomer(s) in the recycle stream. The production rate is conveniently controlled by simply adjusting the rate of catalyst injection.

Since any change in the rate of catalyst injection will change the reaction rate and hence rate of generation of the heat of reaction, the temperature of the recycle stream entering the reactor is adjusted upwards and downwards to accommodate any change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor (the difference between inlet fluid temperature and exit fluid temperature) is indicative of the rate of particulate polymer formation at a constant fluid velocity if no vaporizable liquid is present in the inlet fluid.

On discharge of particulate polymer product from reactor 10, it is desirable and preferable to separate fluid from the product and to return the fluid to the recycle line 22. There are numerous ways known to the art to accomplish this. One preferred system is shown in the drawings. Thus, fluid and product leave reactor 10 at point 44 and enter product discharge tank 46 through valve 48 which is designed to have minimum restriction to flow when opened such as a ball valve. Positioned above and below product discharge tank 46 are conventional valves 50, 52 with the latter being adapted to provide passage of product into product surge tank 54. Product surge tank 54 has venting means illustrated by line 56 and gas entry means illustrated by line 58. Also positioned at the base of product surge tank 54, is a discharge valve 60 which when in the open position discharges product for conveying to storage. Valve 50 when in the open position releases fluid to surge tank 62. Fluid from surge tank 62 is directed through a filter absorber 64 and thence through a compressor 66 and into recycle line 22 through line 68.

In a typical mode of operation, valve 48 is open and valves 50, 52 are in a closed position. Product and fluid enter product discharge tank 46. Valve 48 closes and the product is allowed to settle in product discharge tank 46. Valve 50 is then opened permitting fluid to flow from product discharge tank 46 to surge tank 62 from which it is continually compressed back into recycle line 22. Valve 50 is then closed and valve 52 is opened and any product in product discharge tank 46 flows into product surge tank 54. Valve 52 is then closed. The product is purged with inert gas, preferably nitrogen, which enters product surge tank 54 through line 58 and is vented through line 56. Product is then discharged from product surge tank 54 through valve 60 and conveyed through line 20 to storage.

The particular timing sequence of the valves is accomplished by the use of conventional programmable controllers which are well known in the art. Moreover, the valves can be kept substantially free of agglomerated particles by installation of provisions for directing a stream of gas periodically through the valves and back to the reactor.

Another preferred product discharge system which may be alternatively employed is that disclosed and claimed in the copending U.S. patent application of Robert G. Aronson filed July 28, 1981, Ser. No. 287,815, now abandoned and entitled Fluidized Bed Discharge System. Such a system employs at least one (parallel) pair of tanks comprising a settling tank and a transfer tank arranged in series and having the separated gas phase returned from the top of the settling tank to a point in the reactor near the top of the fluidized bed. Such alternative preferred product discharge system obviates the need for a recompression line 64, 66, 68, as shown in the system of the drawing.

The fluidized-bed reactor is equipped with an adequate venting system (not shown) to allow venting the bed during start up and shut down. The reactor does not require the use of stirring and/or wall scraping. The recycle line 22 and the elements therein (compressor 30, heat exchanger 24) should be smooth surfaced and devoid of unnecessary obstructions so as not to impede the flow of recycle fluid or entrained particles.

Among the polymers which may be produced in the process of the present invention are homopolymers of ethylene, propylene, butene or copolymers of a major mole percent of ethylene, propylene or butene and a minor mole percent of one or more $C_2$ to $C_8$ alpha-olefins. The $C_2$ to $C_8$ alpha-olefins preferably should not contain any branching on any of their carbon atoms which is closer than the fourth carbon atom. The preferred $C_2$ to $C_8$ alpha-olefins are ethylene, propylene, butene-1, pentene-1, hexene-1, 4-methylpentene-1 and octene-1.

The ethylene polymers, for example, have a melt flow ratio of over about 22. The melt flow ratio value is another means of indicating the molecular weight distribution of a polymer. A melt flow ratio (MFR) of 22 thus, for example, corresponds to a Mw/Mn value (as determined by conventional size exclusion chromatography) of about 2.7.

The ethylene homopolymers have a density of about $\geq 0.958$ to $\leq 0.972$ gm/cc.

The ethylene copolymers have a density less than about 0.96 gm/cc. The density of the ethylene copolymer, at a given melt index level for the copolymer, is primarily regulated by the amount of the $C_3$ to $C_8$ comonomer which is copolymerized with the ethylene. In the absence of the comonomer, the ethylene would homopolymerize to provide polymers having a density of about $\leq 0.96$. Thus, the addition of progressively larger amounts of the comonomers to the copolymers results in a progressive lowering of the density of the copolymer. The amount of each of the various $C_3$ to $C_8$ conomoners needed to achieve the same result will vary from monomer to monomer, under the same reaction conditions.

Thus, to produce binary copolymers of ethylene with the same density and melt index, larger molar amounts of the different comonomers would be needed in the order of $C_3 < C_4 < C_5 < C_6 < C_7 < C_8$.

When made in the fluid-bed process described herein, ethylene polymers are granular materials which have a settled bulk density of about 15 to 32 pounds per cubic foot and an average particle size of the order of about 0.005 to about 0.06 inches. Particle size is important for the purposes of readily fluidizing the polymer particles in the fluid-bed reactor, as herein described.

In accordance with the present invention, a process is provided for increasing the space time yield of polymer production in a fluidized bed reactor employing an exothermic polymerization reaction by cooling the recycle stream to below its dew point and returning the resultant two-phase fluid stream to the reactor to maintain the fluidized bed at a desired temperature above the dew point of the recycle stream. The cooling capacity of the recycle stream is increased both due to the greater temperature differential between the entering recycle stream and the reactor and by the vaporization of the condensed liquids entrained in the recycle stream.

It has, therefore, been found that the dew point limitation on the recycle stream broadly held heretofore by those skilled in the art, as pointed out hereinabove, has been unduly limiting and restricting. It has been found that such limitations are erroneous and need not to be practiced.

The amount of condensation, and thus the increase in production rate, can be further enhanced by altering the process conditions so as to increase the dewpoint of the recycle stream. It has been found that the amount of condensation of liquid in the recycle stream can be maintained at up to about 20 percent by weight, preferably up to about 10 percent. This degree of condensation is achieved by maintaining the outlet temperature from the cycle heat exchange zone so as to effect the required degree of cooling below the dew point of the mixture.

EXAMPLE 1

In an example of the process of the invention, a fluidized bed gas phase reaction system, as described above was operated with a partially condensed recycle stream to produce an hexene-1/propylene/ethylene copolymer, under the following conditions:
Recycle Stream Composition (mole percent):
 Nitrogen—34.7
 Ethylene—38.1
 Ethane—8.9
 Propylene—5.1
 Hexene-1—4.8

Hydrogen—7.3
Methane—0.1
Recycle Stream Dewpoint: 57.8° C. (at the pressure of the heat exchanger)
Reactor Gas Inlet Temperature: 48° C.
Liquid in Cycle Gas: 4.6 wt. percent
Catalyst: a complex of tetrahydrofuran, magnesium chloride and titanium chloride reduced with diethyl aluminum chloride (diethyl aluminum chloride-to-tetrahydrofuran molar ratio of 0.4) and tri-n-hexyl aluminum (tri-n-hexyl aluminium-to-tetrahydrofuran molar ratio of 0.4) impregnated on triethyl aluminum treated silica dioxide.
Reactor Temperature: 88° C.
Reactor Pressure: 270 psig
Superficial Gas Velocity in the Fluidized Bed: 2.0 feet/sec.
Bed Height: 37 feet
Bed Diameter: 8 feet
Space Time Yield: 5.1 lb/ft$^3$hr
Melt Index of Resin: 1.0 dg/min
Density of Resin: 0.918 gm/cc
Activator: triethyl aluminum

EXAMPLE 1a

The following example was carried out under essentially identical operating conditions as Example 1, differing only with respect to the cooling of the recycle stream and the rate of catalyst injection.
Recycle Stream Composition (mole percent):
 Nitrogen—36.5
 Ethylene—38.2
 Ethane—11.2
 Propylene—5.0
 Hexene-1—4.1
 Hydrogen—4.8
Methane None detected
Recycle Stream Dew Point: 53.2° C. (at the pressure of the heat exchanger)
Reactor Gas Inlet Temperature: 60.6° C.
Liquid in Cycle Gas: Zero
Reactor Temperature: 87.1° C.
Reactor Pressure: 270 psig
Superficial Gas Velocity in the Fluidized Bed: 2.0 ft/sec
Bed Height: 37 feet
Bed Diameter: 8 feet
Space Time Yield: 2.0 lb/ft$^3$hr
Melt Index of Resin: 1.0 dg/min
Density of Resin: 0.918 gm/cc
Activator: triethyl aluminum
It is to be noted that operation below the dew point of the recycle stream, as in Example 1, resulted in an increase in space time yield (pounds of resin produced per cubic foot of bed per hour) which was approximately 2.5 times those obtained without the employment of the liquid phase in the recycle stream, as in this Example 1a.

EXAMPLE 2

In another Example, employing butene-1 rather than propylene and hexene-1 as the other alpha-olefin monomer, the following conditions were maintained:
Recycle Stream Composition (mole percent)
 Hydrogen—6.3
 Ethylene—57.8
 Butene-1—26.7
 Inerts—9.2
Recycle Stream Dewpoint: 49.7° C. (at the pressure of the heat exchanger)
Reactor Gas Inlet Temperature: 47.2° C.
Liquid in Cycle Gas: 1.2 wt. percent
Catalyst: a complex of tetrahydrofuran, magnesium chloride and titanium chloride reduced with tri-n-hexyl aluminum only (tri-n-hexyl aluminum-to-tetrahydrofuran molar ratio of 0.7) impregnated on triethyl aluminum treated silica dioxide.
Reactor Temperature: 87.5° C.
Reactor Pressure: 269 psig
Superficial Gas Velocity in the Fluidized Bed: 2.0 ft/sec
Bed Height: 37 feet
Bed Diameter: 8 feet
Space Time Yield: 6.2 lb/ft$^3$hr
Melt Index of Resin: 1.0 dg/min
Density of Resin: 0.918 gm/cc
Activator: triethyl aluminum

EXAMPLE 2a

The following example was conducted under conditions similar to those employed in Example 2 but without condensed liquid in the recycle gas stream.
Recycle Stream Composition (mole percent):
 Hydrogen—4.5
 Ethylene—59.3
 Butene-1—26.7
 Inerts—9.5
Recycle Stream Dew Point: 44.1° C. (at the pressure of the heat exchanged)
Reactor Gas Inlet Temperature: 56° C.
Liquid in Cycle Gas: Zero
Catalyst: A complex of tetrahydrofuran, magnesium chloride and titanium chloride reduced with tri-n-hexyl aluminum only (tri-n-hexyl aluminum-to-tetrahydrofuran molar ratio of 0.7) impreganted on triethyl aluminum treated silica dioxide.
Reactor Temperature: 83.7° C.
Reactor Pressure: 265 psig
Superficial Gas Velocity in the Fluidized Bed: 2.14 ft/sec
Bed Height: 37.5 feet
Bed Diameter: 8 feet
Space Time Yield: 3.7 lb/ft$^3$hr
Melt Index of Resin: 1.0 dg/min
Density of Resin: 0.918 gm/cc
Activator: triethyl aluminum

EXAMPLES 3–8

The six following examples in tabular form set forth further information for practicing the process of the invention employing various condensing recycle streams for enhanced cooling of the fluidized bed in the polymerization of hexene-1/butene-1/ethylene, ethylene/propylene, ethylene/butene-1, pentene-1/ethylene, as well as the use of iso-pentane as an inert fluid in the polymerization of butene-1/ethylene and ethylene, respectively.

| Example No. | 3 | 4 | 5 | 6 | 7 | 8 |
|---|---|---|---|---|---|---|
| Product | $C_6/C_4/C_2$ Copolymer | $C_2/C_3$ Copolymer | $C_2/C_4$ Copolymer | $C_5/C_2$ Copolymer | $C_4/C_2$ Copolymer | $C_2$ Homopolymer |
| Recycle Stream | | | | | | |

-continued

| Example No. | 3 | 4 | 5 | 6 | 7 | 8 |
|---|---|---|---|---|---|---|
| Composition (mole percent): | | | | | | |
| Nitrogen | 34.7 | 17.4 | 43.5 | 40.7 | 15.7 | 37.5 |
| Ethylene | 38.1 | 0.64 | 0.25 | 35.0 | 38.6 | 35.0 |
| Ethane | 8.9 | — | — | 9.0 | 3.0 | 5.0 |
| Propylene | — | 63.5 | — | — | — | — |
| Propane | — | 16.5 | — | — | — | — |
| Butene-1 | 5.1 | — | 50.0 | — | 17.7 | — |
| Butane | — | — | 5.0 | — | 2.3 | — |
| Pentene-1 | — | — | — | 10.5 | — | — |
| Isopentane | 1.0 | 1.0 | 0.5 | — | 14.2 | 10.5 |
| Hexene-1 | 4.8 | — | — | — | — | — |
| Hydrogen | 7.3 | 0.95 | 0.75 | 3.8 | 6.2 | 11.0 |
| Methane | 0.1 | — | — | 1.0 | 2.3 | 1.0 |
| Recycle Stream Dewpoint (°C.)* | 63.0 | 44.4 | 44.0 | 53.7 | 74.4 | 47.4 |
| Reactor Inlet Temperature (°C.) | 54.3 | 43.5 | 41.6 | 42.5 | 65.9 | 34.0 |
| Liquid in Cycle Gas (wt. percent) | 4.8 | 4.2 | 8.8 | 8.4 | 11.5 | 10.5 |
| Reactor Temperature (°C.) | 88 | 60 | 50 | 88 | 88 | 110 |
| Reactor Pressure (psig) | 270 | 270 | 121 | 270 | 270 | 270 |
| Superficial Gas Velocity in Fluidized Bed (ft/sec) | 2.0 | 1.7 | 2.0 | 2.0 | 2.0 | 2.0 |
| Bed Height (feet) | 37 | 37 | 37 | 37 | 37 | 37 |
| Space Time Yield (lb/ft$^3$ hr.) | 5.5 | 6.6 | 4.0 | 8.0 | 7.0 | 10.7 |

*At the pressure of the heat exchanger

The space time yield improvements achieved by the practice of this invention are the result of the increased cooling capacity of the recycle stream. This increased capacity is due both to the greater temperature differential between the entering recycle stream and the bed temperature and to the evaporation of condensed liquid entrained in the recycle stream.

It will be appreciated that increased cooling is achieved not only by evaporation of entering entrained liquid, but also by the overall reduction in the temperature of both the gas and liquid phases of the recycle stream in comparison to previously known methods of operation of fluidized bed reactor systems.

Although the process of the invention can be applied to increase the production rate from existing and new commercial reactors, the invention also has the potential of reducing equipment cost in new reactors. For example, plants designed according to the prior art for the production of certain ethylene copolymers made using hexene-1 as an other alpha olefin must have larger diameter reactors due to the lower space time yield. Since this invention increases the space time yield for products made with hexene-1 to that of conventional butene-1/ethylene copolymers, the extra cost associated with the larger diameter reactor can be eliminated by practicing the present invention. Alternately, the large diameter reactor can be retained and the velocity of the recycle stream reduced, resulting in lower capital and operating costs for the cycle gas compressor.

Advantages of this invention over other heat removal methods which use condensed liquids include the simplicity of this invention, good liquid distribution, maximum heat removal, and uniform gas stream composition in the polymerization zone as a result of introducing the two-phase recycle stream in the lower regions of the reactor. No liquid collection, separation, or injection equipment is required and the liquids are dispersed in the stream entering the fluidized bed over the entire cross-sectional area, avoiding temperature gradients and high local concentrations of liquid around injection means.

What is claimed is:

1. In a continuous gas fluidized bed polymerization process for the production of polymer from monomer by continuously passing a gaseous stream comprising said monomer through a fluidized bed reactor in the presence of catalyst under reactive conditions, withdrawing polymeric product and a stream comprising unreacted monomer gases, cooling said stream comprising unreacted monomer gases and returning said cooled stream to said reactor together with sufficient additional monomer to replace that monomer polymerized and withdrawn as product, the improvement which comprises: cooling part or all of said stream comprising unreacted monomer gases to form a mixture comprising a gas phase and a liquid phase and reintroducing said mixture into said reactor wherein said liquid phase is vaporized.

2. An improved process according to claim 1 wherein said stream comprising unreacted gases is compressed prior to cooling.

3. An improved process according to claim 1 wherein means are provided to maintain said liquid phase entrained in said mixture until such time as said liquid phase is vaporized.

4. An improved process according to claim 1 wherein an inert condensible fluid is present in said mixture to raise the dew point of said mixture.

5. An improved process according to claim 4 wherein said inert condensible fluid is a saturated hydrocarbon.

6. An improved process according to claim 1 wherein said liquid phase of said mixture is less than about 20 percent by weight of the total weight of said mixture.

7. An improved process according to claim 1 wherein said liquid phase of said mixture is less than about 10 percent by weight of the total weight of said mixture.

8. An improved process according to claim 1 wherein the flow rate of said mixture and the ratio of gas to liquid therein are maintained at levels sufficient to maintain said liquid entrained in said gas until vaporized.

9. An improved process according to claim 1 wherein said mixture is divided into at least two separate streams at least one of which is introduced into the reactor at a point below the fluidized bed and one or more of said separate streams is optionally introduced into said fluidized bed, provided that the velocity of all gases introduced below said fluidized bed is at least sufficient to support said bed and to maintain it in a fluidized condition.

10. An improved process according to claim 1 wherein the gas stream flowing upwardly through the fluidized bed is essentially uniform in composition and moving in a manner through said bed such that the entire bed is maintained in a gas fluidized condition and with essentially no dead spaces through which gases do not pass.

11. An improved process according to claim 1 wherein said additional monomer, added to replace monomer polymerized and withdrawn as product, is introduced into said reactor in liquid form, below the fluidized bed and at or near the point of entry of said mixture into said reactor.

12. An improved process according to claim 1 wherein said additional monomer added to replace monomer polymerized and withdrawn as product is introduced into said mixture prior to entry of said mixture into said reactor.

13. An improved process according to claim 1 wherein gas distributor means is provided immediately below the fluidized bed and above the region wherein said mixture is introduced into said reactor.

14. An improved process according to claim 1 wherein the internal pressure within said reactor is from about 100 psi to about 350 psi.

15. An improved process according to claim 1 wherein said monomer is an alpha olefin monomer having from two to four carbon atoms alone or in admixture with one or more other alpha olefin monomers having from two to eight carbon atoms.

16. An improved process according to claim 15, wherein said monomer is ethylene alone or in admixture with one or more other alpha olefin monomers having from two to eight carbon atoms.

17. An improved process according to claim 15, wherein said monomer is propylene alone or in admixture with one or more other alpha olefin monomers having from two to eight carbon atoms.

18. A method for controlling the temperature of a gas fluidized bed during the production of polymer in a fluidized bed reactor by an exothermic polymerization reaction, which comprises continuously introducing into the bed a stream comprising unreacted monomer gas cooled to below the maximum desired temperature within said bed and simultaneously or separately introducing a stream of liquid into said reactor under conditions such that an essentially uniform mixture of said gas and liquid is introduced into said bed at a level below the region of maximum desired temperature within said reactor wherein said liquid is vaporized.

19. A process for producing polymer from monomer by an exothermic polymerization reaction in a gas fluidized bed reactor having an upper polymerization zone containing a bed of growing polymer particles and a lower gas diffusion zone, which comprises:
(1) continuously passing a gaseous stream comprising monomer through said polymerization zone with an upward velocity sufficient to maintain said particles in a suspended and gas fluidized condition;
(2) introducing a polymerization catalyst into said polymerization zone;
(3) withdrawing polymer product from said polymerization zone;
(4) continuously withdrawing a stream of unreacted gases comprising monomer from said polymerization zone, compressing and cooling said stream to a temperature below the dew point of said stream to form a mixture comprising a gas phase and a liquid phase; and
(5) continuously introducing said mixture into said polymerization zone wherein said liquid phase is vaporized.

20. A process according to claim 19 wherein an inert, condensible fluid is present in said mixture to raise the dew point of said mixture.

21. An improved process according to claim 20 wherein said inert, condensible fluid is a saturated hydrocarbon.

22. A process according to claim 19 wherein the liquid phase of said mixture is less than about 20 percent by weight of the total weight of said mixture.

23. A process according to claim 19 wherein the liquid phase of said mixture is less than about 10 percent by weight of the total weight of said mixture.

24. A process according to claim 19 wherein the flow rate of said mixture and the ratio of gas to liquid in said mixture are maintained at levels sufficient to maintain said liquid entrained in said gas until vaporized.

25. A process according to claim 19 wherein the gas stream flowing upwardly through the fluidized bed is essentially uniform in composition and moving in a manner through said bed such that the entire bed is maintained in a fluidized condition and with essentially no dead spaces through which gases do not pass.

26. A process according to claim 19 wherein additional monomer in liquid or gaseous form is added below the polymerization zone and at or near the point of entry of said mixture into said reactor to replace monomer polymerized and withdrawn as product.

27. A process according to claim 19 wherein additional monomer is added to replace monomer polymerized and withdrawn as product by injection into said mixture prior to entry of said mixture into the reactor.

28. A process according to claim 19 wherein gas distributor means is provided immediately below said polymerization zone.

29. A process according to claim 19 wherein the internal pressure within said reactor is from about 100 psi to about 350 psi.

30. A process according to claim 19 wherein said polymer is produced by reaction of an alpha olefin monomer having from two to four carbon atoms alone or in admixture with one or more other alpha olefin monomers having from two to eight carbon atoms.

31. An improved process according to claim 30, wherein said monomer is ethylene alone or in admixture with one or more other alpha olefin monomers having from two to eight carbon atoms.

32. An improved process according to claim 30, wherein said monomer is propylene alone or in admixture with one or more other alpha olefin monomers having from two to eight carbon atoms.

33. A method for controlling the temperature of a fluidized bed during the production of polymers in a gas fluidized bed reactor by an exothermic polymerization reaction which comprises continuously introducing a stream comprising an essentially uniform gas-liquid mixture containing monomer into said bed wherein said liquid is vaporized.

34. In a continuous gas fluidized bed polymerization process for the production of polymer from monomer by continuously passing a gaseous stream comprising said monomer through a fluidized bed reactor in the presence of catalyst under reactive conditions, withdrawing polymeric product and a stream comprising unreacted monomer gases, cooling said stream comprising unreacted gases and returning said cooled stream to said reactor together with sufficient additional monomer to replace that monomer polymerized and withdrawn as product, the improvement which comprises: cooling part or all of said stream comprising unreacted gases to form a mixture comprising a gas phase and a liquid phase and reintroducing said mixture into said reactor wherein said liquid phase is volatilized; said gaseous stream passing through said fluidized bed reactor at a superficial velocity sufficient to maintain a viable fluidized bed.

35. A process for producing polymer from monomer by an exothermic polymerization reaction in a gas fluidized bed reactor having an upper polymerization zone containing a bed of growing polymer particles and a lower gas diffusion zone, which comprises:
    (1) continuously passing a gaseous stream comprising monomer through said polymerization zone with an upward velocity sufficient to maintain said particles in a suspended and gas fluidized condition;
    (2) introducing a polymerization catalyst into said polymerization zone in an inert gas stream at a point 20-40% of the diameter away from the reactor wall and about 5-30% of the height of the bed;
    (3) withdrawing polymer product from said polymerization zone;
    (4) continuously withdrawing a stream of unreacted gases comprising monomer from said polymerization zone, compressing and cooling said stream to a temperature below the dew point of said stream to form a mixture comprising a gas phase and a liquid phase; and
    (5) continuously introducing said mixture into said polymerization zone wherein said liquid phase is vaporized.

36. A process for producing polymer from monomer by an exothermic polymerization reaction in a gas fluidized bed reactor having an upper polymerization zone containing a bed of growing polymer particles and a lower gas diffusion zone, which comprises:
    (1) continuously passing a gaseous stream comprising monomer through said polymerization zone with an upward velocity sufficient to maintain said particles in a suspended and gas fluidized condition;
    (2) introducing a polymerization catalyst into said polymerization zone;
    (3) withdrawing polymer product from said polymerization zone;
    (4) continuously withdrawing a stream of unreacted gases comprising monomer from said polymerization zone, compressing and cooling said stream to a temperature below the dew point of said stream to form a mixture comprising a gas phase and a liquid phase;
    (5) continuously introducing said mixture into said polymerization zone wherein said liquid phase is vaporized; and
    (6) controlling the temperature of said mixture so as to maintain constant temperature in said polymerization zone, as the change in polymerization catalyst feed is varied to control the rate of said polymerization.

37. In a continuous gas fluidized bed polymerization process for the production of polymer from monomer comprising ethylene and/or propylene by continuously passing a gaseous stream comprising said monomer through a fluidized bed reactor in the presence of catalyst under reactive conditions, withdrawing polymeric product and a stream comprising unreacted gases, comprising monomer, cooling said stream comprising unreacted gases and returning said cooled stream to said reactor together with sufficient additional monomer to replace that monomer polymerized and withdrawn as product, the improvement which comprises: cooling part or all of said stream comprising unreacted gases to form a mixture comprising a gas phase and a liquid phase and reintroducing said mixture into said reactor wherein said liquid phase is vaporized.

38. An improved process according to claim 37 wherein said monomer comprises ethylene in admixture with one or more other alpha olefin monomers having from two to eight carbon atoms.

39. An improved process according to claim 37 wherein said monomer comprises propylene in admixture with one or more other alpha olefin monomers having from two to eight carbon atoms.

* * * * *

UNITED STATES PATENT AND TRADEMARK OFFICE
CERTIFICATE OF CORRECTION

PATENT NO. : 4,543,399

DATED : September 24, 1985

INVENTOR(S) : J.M. Jenkins, III; R.L. Jones; T.M. Jones; S. Beret

It is certified that error appears in the above-identified patent and that said Letters Patent is hereby corrected as shown below:

In the title page, Item 75, "John M. Jenkins, III; Russell L. Jones, both of South Charleston; Thomas M. Jones, Dunbar, all of W. Va." should read -- John M. Jenkins, III; Russell L. Jones, both of South Charleston; Thomas M. Jones, Dunbar, all of W. Va.; Samil Beret of Danville, Ca. --

Column 10, line 20;  "$C_3<C_4<C_5<C_6<C_7<C_8$" should read

-- $C_3>C_4>C_5>C_6>C_7>C_8$ --

Signed and Sealed this

Fourteenth Day of January 1986

[SEAL]

Attest:

Attesting Officer

DONALD J. QUIGG

Commissioner of Patents and Trademarks